United States Patent
Zheng et al.

(10) Patent No.: US 11,227,221 B2
(45) Date of Patent: Jan. 18, 2022

(54) FRAMEWORK MANAGEMENT METHOD AND APPARATUS

(71) Applicant: Shenzhen Intellifusion Technologies Co., Ltd., Guangdong (CN)

(72) Inventors: Haigang Zheng, Guangdong (CN); Xutao Lv, Guangdong (CN); Xiaoyu Wang, Guangdong (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/257,326

(22) PCT Filed: Oct. 31, 2019

(86) PCT No.: PCT/CN2019/114730
§ 371 (c)(1),
(2) Date: Dec. 31, 2020

(87) PCT Pub. No.: WO2020/134549
PCT Pub. Date: Jul. 2, 2020

(65) Prior Publication Data
US 2021/0248487 A1    Aug. 12, 2021

(30) Foreign Application Priority Data
Dec. 27, 2018  (CN) .......................... 201811611822.8

(51) Int. Cl.
*G06N 5/02* (2006.01)
*G06N 20/00* (2019.01)

(52) U.S. Cl.
CPC ............. *G06N 5/027* (2013.01); *G06N 20/00* (2019.01)

(58) Field of Classification Search
CPC .............................. G06N 5/027; G06N 20/00
(Continued)

(56) References Cited

U.S. PATENT DOCUMENTS

| 6,782,350 B1 * | 8/2004 | Burnley | G06F 11/3419 702/186 |
| 8,473,431 B1 * | 6/2013 | Mann | G06N 20/00 706/12 |

(Continued)

FOREIGN PATENT DOCUMENTS

GN        108958892 A      12/2018

OTHER PUBLICATIONS

Geoertzel et al., "Part 2—The CogPrime Architecture for Integrative, Embodied AGI", Atlantis Press, 2014 (Year: 2014).*

*Primary Examiner* — Tsu-Chang Lee

(57) ABSTRACT

Disclosed are a framework management method and an apparatus. The method includes: a server acquiring a training request sent by a client, wherein the training request includes a function command and configuration data including a type of model framework, a path of a script, a path of a training data set and model hyper-parameters; the server determining whether configurations of the server are correct; if so, the server acquiring a model framework mirror image corresponding to the type of the model framework; the server starting a container for operating the model framework mirror image; the server reading, according to the paths of the script and the training data set, the script and the training data set into the container for operation; and the server executing the function command to implement a function that the function command instructs the server to execute.

11 Claims, 5 Drawing Sheets

(58) Field of Classification Search
USPC .......................................................... 706/10
See application file for complete search history.

(56) References Cited

U.S. PATENT DOCUMENTS

| | | | |
|---|---|---|---|
| 2010/0058328 A1* | 3/2010 | DeHaan | G06F 8/61 |
| | | | 717/176 |
| 2011/0066841 A1* | 3/2011 | Goodrow | H04L 43/106 |
| | | | 713/150 |
| 2019/0102695 A1* | 4/2019 | Biswas | G06F 13/102 |

* cited by examiner

FRAMEWORK MANAGEMENT METHOD AND APPARATUS

1. CROSS-REFERENCE TO RELATED APPLICATION

This application claims priority to Chinese Patent Application No. 201811611822.8, entitled "FRAMEWORK MANAGEMENT METHOD AND APPARATUS" and filed on Dec. 27, 2018, the content of which is hereby incorporated by reference in its entirety.

2. TECHNICAL FIELD

The present disclosure generally relates to artificial intelligences (AI) field, and especially relates to a framework management method and an apparatus.

3. DESCRIPTION OF RELATED ART

With growth of data scale, calculation and storage capacity, artificial intelligence (AI) is developed rapidly and used in various fields widely, both machine learning and deep learning are configured to learn corresponding relations of training data by inputting the training data, and finally output a model. When new data is input into the model, corresponding prediction results are occurred in the model.

In order to obtain the model that can be predicted accurately, a large amount of training data and an appropriate model structure are needed, in order to conveniently train the model, a plurality of model frameworks have been introduced, and different model frameworks are needed to configure different operating environments corresponding to the different model frameworks. In this way, a plurality of operating environments corresponding to the different model frameworks are required to be configured in the server, thereby not only system resources are wasted, but also interference for training the model is caused because the plurality of model frameworks are simultaneously coexisted in the server.

SUMMARY

The technical problems to be solved: in view of the shortcomings of the related art, the present disclosure relates to a framework management method and an apparatus which can simplify environment deployment of different model frameworks and solve problems of environment isolation and resource scheduling when a plurality of model frameworks are coexisted.

In a first aspect, a framework management method according to an embodiment of the present disclosure includes:

obtaining, by a server, a training request sent by a client, wherein the training request includes a functional command configured to indicate a function performed by the server, and configuration data including a type of a model framework, a path of a script, a path of a training data set, and model hyper-parameters;

determining, by the server, whether configurations of the server are correct, according to the type of the model framework, the path of the script, the path of the training data set, and the model hyper-parameters included in the configuration data;

if configurations of the server are correct, obtaining, by the sever, a model framework mirror image corresponding to the type of the model framework from a mirror repository, wherein the model framework mirror image is configured to encapsulate the model framework and operating environments of the model framework;

starting, by the server, a container configured to operate the model framework mirror image, wherein the operating environments of the model framework are operated in the container, and the model framework is operated in the operating environments of the model framework;

reading, by the sever, the script and the training data set into the container for operation, according to the path of the script and the path of the training data set; and according to the model framework, the script, the training data set, and the model hyper-parameters, performing, by the server, the function command to implement the function command is configured to instruct the server to execute.

In a second aspect, a framework management server according to an embodiment of the present disclosure includes:

a first obtaining unit configured to obtain a training request sent by a client, wherein the training request includes a functional command configured to indicate a function performed by the server, and configuration data including a type of a model framework, a path of a script, a path of a training data set, and model hyper-parameters;

a judging unit configured to determine whether configurations of the server are correct, according to the type of the model framework, the path of the script, the path of the training data set, and the model hyper-parameters included in the configuration data;

a second obtaining unit configured to: if configurations of the server are correct, obtain a model framework mirror image corresponding to the type of the model framework from a mirror repository, wherein the model framework mirror image is configured to encapsulate the model framework and operating environments of the model framework;

a starting unit configured to starting a container configured to operate the model framework mirror image, wherein the operating environments of the model framework are operated in the container, and the model framework is operated in the operating environments of the model framework;

a reading unit configured to read the script and the training data set into the container for operation, according to the path of the script and the path of the training data set; and a performing unit configured to perform the function command to implement that the function command is configured to instruct the server to execute, according to the model framework, the script, the training data set, and the model hyper-parameters.

It can be seen that, by the framework management method and the server of the present disclosure, the container engine is installed in the server, so that users can package applications and corresponding dependent packages into a portable container, in this way, no interface is formed between the containers. Comparing to a way of installing a plurality of model frameworks and operating environments of the plurality of model frameworks in the server, it is easier that the container engine is installed in the server. The model framework and its operating environments are encapsulated in the model framework mirror image, and different model frameworks correspond to different model framework mirror images. During training the model, the server is configured to obtain the training request which carries the type of the model framework, and the server is configured to obtain a corresponding model framework mirror image according to the type of the model framework, so as to start the container for running the model framework mirror image and realize to train the model. In this way, there is no need to deploy a plurality of model frameworks and corresponding operating environments in the server, thereby system resources can be saved. Furthermore, since there is no interface between containers that is run different model framework mirror images, the model can't be affected by other model frameworks when the model is trained, therefore, the present disclosure can solve problems of environment isolation and resource scheduling when the plurality of model frameworks are coexisted.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Figure 1:
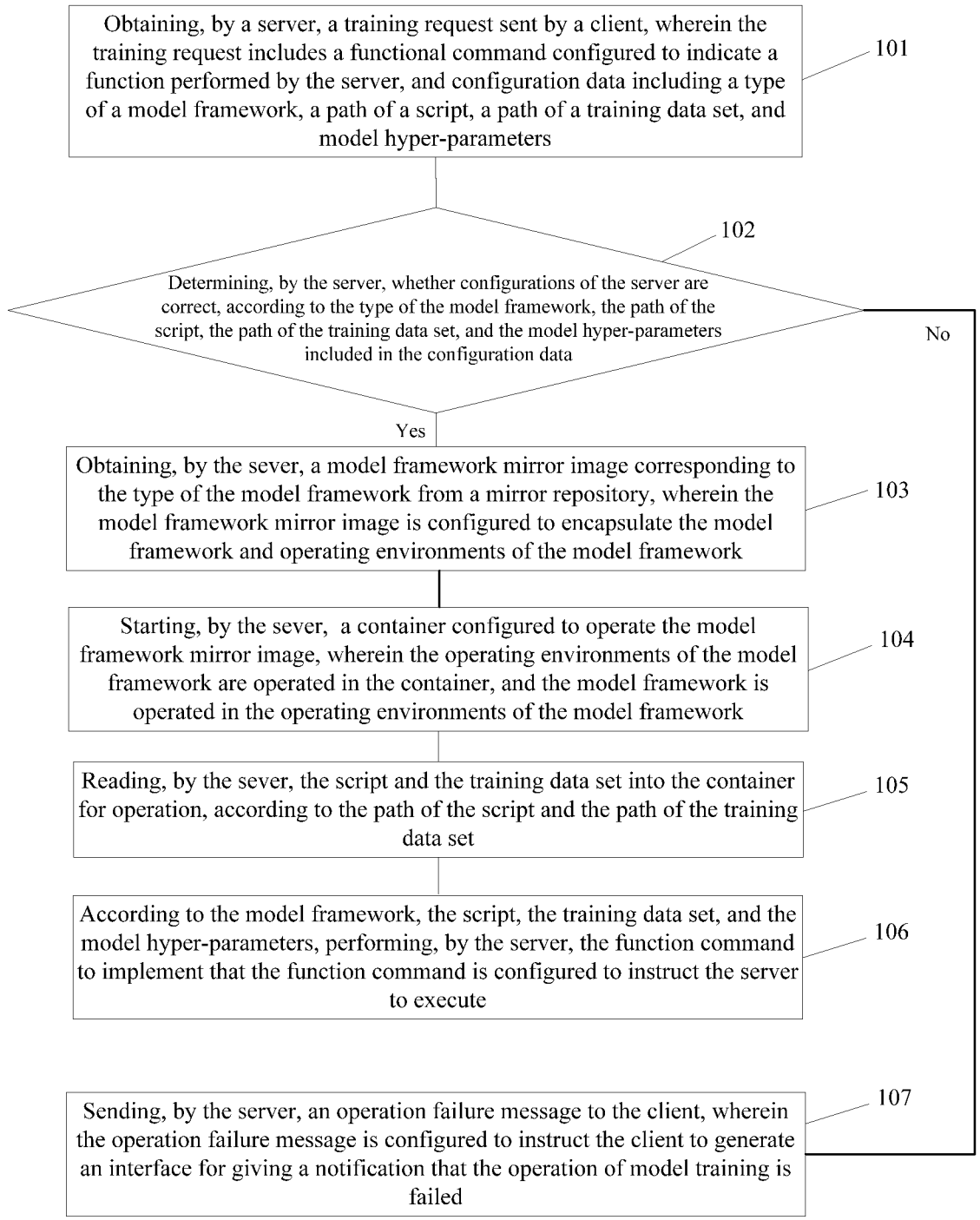
FIG. 1 is a flowchart of a framework management method in accordance with an embodiment of the present disclosure.

FIG. 1 illustrates a flowchart of a framework management method in accordance with an embodiment of the present disclosure. Referring to FIG. 1, the framework management method includes:

step 101, obtaining, by a server, a training request sent by a client, wherein the training request includes a functional command configured to indicate a function performed by the server, and configuration data including a type of a model framework, a path of a script, a path of a training data set, and model hyper-parameters.

When model training is started, a user sends a training request to the server through the client, the training request includes the functional command and the configuration data, the functional command configured to indicate a function performed by the server and includes functions such as running models and testing models. The configuration data includes the type of the model framework to be used for the model training, the path of the script, the path of the training data set to be used in a model training process, and the model hyper-parameters.

Furthermore, the type of the model framework includes tensor flow graph frameworks, etc. Since a large amount of training data is used in the model training process, it is more convenient to train a model that can be predicted accurately.

Scripting languages is typically used for the model training, so a full script is required to run the model. The training data set is referred to data used for training the model, and includes pictures, texts, audios or videos etc. The training data set is input to learn corresponding relations of the data, and finally a model is output. Therefore, a complete training data set is needed to realize the model training.

The model hyper-parameters are configurations outside the model, and values of the model hyper-parameters are needed to be set manually. Moreover, the model hyper-parameters are usually adjusted according to different models. In the different models, the model super-parameters include a learning rate, a batch size, an optimizer, iteration times and an activation function, etc. For example, in an optimization algorithm, the model hyper-parameters needed to be set include the learning rate, which is amplitude of updating network weights. Too much learning rate can lead to non-convergence of the model, and too little learning rate can lead to slow convergence of the model so that a longer training time is required.

Step 102, determining, by the server, whether configurations of the server are correct, according to the type of the model framework, the path of the script, the path of the training data set, and the model hyper-parameters included in the configuration data.

Optionally, a container engine is installed in the server and the server includes a container sever configured to receive and process requests from the client, and the container engine installed in the server is communicated with a registration server that is an important component in the container engine. N mirror images are stored in the registration server and N is a positive integer.

The step of determining, by the server, whether configurations of the server are correct, according to the type of the model framework, the path of the script, the path of the training data set, and the model hyper-parameters, includes:

the server is configured to search through the container server, whether a first mirror image matched with the type of the model framework is existed in the registration server. Specifically, it is searched whether the first mirror image is existed in the N mirror images, if the first mirror image matched with the type of the model framework isn't existed in the registration server, it is indicated that configurations of the server are wrong.

If the first mirror image matched with the type of the model framework is existed in the registration server, it is indicated that the server can be configured to run a model framework corresponding to the type of the model framework. The server is configured to verify integrity of the script and the training data set, according to the path of the script and the path of the training data set. The integrity of the script is a necessary condition for smoothly run codes of the model training, and because the training data set is an important part of the model training, data in the training data set is input from the outside, and the input data can have invalid or wrong information, the training data set is also a necessary condition for training the model that can be predicted accurately. Therefore, if at least one of the script and the training data set is incomplete, configurations of the server are wrong.

If the script and the training data set are complete, the server is configured to determine whether the model hyper-parameters are within a preset model hyper-parameter range.

Since the model hyper-parameters are needed to be set manually, and the model hyper-parameters are usually adjusted according to the different models, in this way, reasonable adjustment of the model hyper-parameters can train the model more scientifically and improve resource utilization. In the different models, the model super-parameters include a learning rate, a batch size, an optimizer, iteration times and an activation function, etc. For example, in an optimization algorithm, the model hyper-parameters needed to be set include the learning rate, which is amplitude of updating network weights. Too much learning rate can lead to non-convergence of the model, and too little learning rate can lead to slow convergence of the model so that a longer training time is required, in this way, the leaning rate is usually 0.01, 0.001 and 0.0001. For another example, for training a neural network, the model super parameters needed to be set include a batch size that is number of samples sent into the model by training the neural network at each time. Large batches can usually make the network converge faster, but due to limitation of memory resources, the large batches can cause insufficient memories or program kernel crashes, so the batch sizes are usually 16, 32, 64 and 128.

If the model hyper-parameters are within the preset model hyper-parameter range, configurations of the server are correct. To ensure that the server is configured correctly, it should be satisfied that the first mirror image matched with the type of the model framework is existed in the registration server, the script and the training data set are complete, and the model hyper-parameters are within the preset model hyper-parameter range.

Step 103, if configurations of the server are correct, the server is configured to obtain a model framework mirror image corresponding to the type of the model framework from a mirror repository, wherein the model framework mirror image is configured to encapsulate the model framework and operating environments of the model framework.

Furthermore, the registration server includes a management server and a mirror repository. The management server is configured to be responsible for and maintain information of users' accounts, verifications of mirror images, and information of common namespaces, and the mirror repository is a mirror and chart repository that is authenticated by an authentication identification method of the management server. The mirror repository includes types of a third-party mirror repository, a vendor mirror repository and a private mirror repository. The N mirror images are specifically stored in the mirror repository, and the first mirror image is belonged to the N images stored in the mirror repository.

Optionally, if the first mirror image is stored in a public repository, the first mirror image can be obtained without authentication. The server is configured to send a first obtaining mirror image request through the container engine to the management server, wherein, the first obtaining mirror image request is configured to indicate that the management server returns an address of the mirror repository to the server. The server is configured to access the address of the mirror repository through the container engine to obtain the first mirror image, and the first mirror image is the model framework mirror image.

Optionally, if the first mirror image is stored in a private repository, it is required to verify authentication to obtain the first mirror image. The server is configured to send a second obtaining mirror image request through the container engine to the management server, wherein, the second obtaining mirror image request is configured to indicate that the management server returns the address of the mirror repository and verifying identification to the server, the verifying identification configured for identity authentication of the server.

The sever is configured to send a third obtaining mirror image request through the container engine to the management server, wherein, the third obtaining mirror image request is configured to carry the verifying identification and indicate whether the verifying identification that the mirror repository validates to the management server is correct. When the verifying identification is correct, obtaining, by the server, the first mirror image from the mirror repository, the first mirror image is the model framework mirror image.

Step 104, starting, by the server, a container configured to operate the model framework mirror image, wherein the operating environments of the model framework are operated in the container, and the model framework is operated in the operating environments of the model framework.

Furthermore, the container engine includes the container, in order to run the container, it is needed to specify a mirror image as an initialized file system, therefore, the server is configured to take the model framework mirror image as the initialized file system to start the container. Because the model framework and operating environments of the model framework are encapsulated in the model framework mirror image, after the container is started, the operating environments of the model framework are operated in the container, and the model framework is operated in the operating environments of the model framework.

Step 105, the sever is configured to read the script and the training data set into the container for operation, according to the path of the script and the path of the training data set.

Furthermore, the container engine further includes data volume, the data volume is a specific file or folder in one or more containers and can be existed in a host independent of a federated file system to facilitate data sharing and persistence. When the container is created, the data volume is initialized. The data volume can be available for using files within the container when the container is run. The data volume can also be shared and reused between different containers. A life cycle of the data volume is independent of a life cycle of the container, and the data volume can still be existed even if the container is deleted.

The server is configured to set a source path of the data volume to the path of the script and the path of the training data set, and set a mount path of the data volume to a path of the container. After the container is started, the server is configured to obtain the paths of the script and the training data set through the source path of the data volume so as to obtain the script and the training data set, and read the script and the training data set into the container for operation, through the mount path of the data volume.

Step 106, according to the model framework, the script, the training data set, and the model hyper-parameters, the server is configured to perform the function command to implement that the function command is configured to instruct the server to execute.

Step 107, if configurations of the server aren't correct, the server is configured to send an operation failure message to the client, wherein the operation failure message is configured to instruct the client to generate an interface for giving a notification that the operation of the model training is failed.

It can be seen that, by the present disclosure, the server includes the container engine installed therein to encapsulate the model framework and the operating environments of the model framework into the model framework mirror image, containers are mirrorly created by the model framework so that no interface is between the containers. Comparing to a way of installing a plurality of model frameworks and operating environments of the plurality of model frameworks in the server, it is easier that the container engine is installed in the server. The model framework and the operating environments are encapsulated in the model framework mirror image, during training the model, the server is configured to obtain the training request which carries the type of the model framework, and the server is configured to obtain a corresponding model framework mirror image according to the type of the model framework, so as to start the container for running the model framework mirror image and realize the model training. In this way, there is no need to deploy a plurality of model frameworks and corresponding operating environments in the server, thereby system resources can be saved. Furthermore, since there is no interface between the containers, the model can't be affected by other model frameworks after the container is started for running the model framework mirror image, therefore, the present disclosure can solve problems of environment isolation and resource scheduling when a plurality of model frameworks are coexisted.

Figure 2:
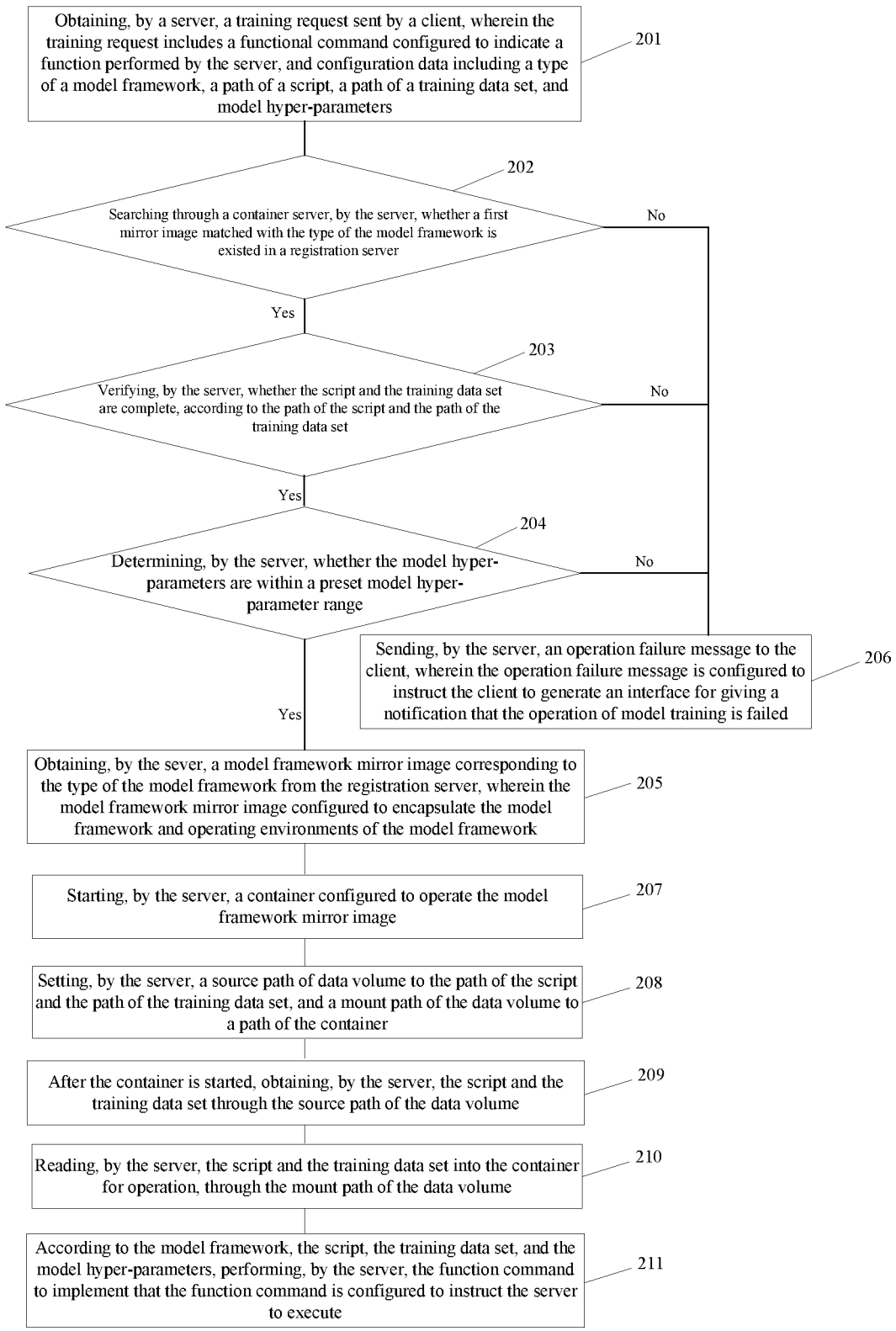
FIG. 2 is a flowchart of a framework management method in accordance with another embodiment of the present disclosure.

FIG. 2 illustrates a flowchart of a framework management method in accordance with another embodiment of the present disclosure. Referring to FIG. 2, in the framework management method according to this embodiment of the present disclosure, the server is a server pre-selected from a server cluster that includes M servers and meets configuration requirements and load requirements. In addition, container engines, including container servers, are installed in the M servers of the server cluster. The container sever is configured to receive and process requests from the client, and the container engine installed in the server is communicated with a registration server that is an important component of the container engine. N mirror images are stored in the registration server and N is a positive integer. In the embodiment of the present disclosure, the framework management method can include:

step 201, obtaining, by a server, a training request sent by a client, wherein the training request includes a functional command configured to indicate a function performed by the server, and configuration data including a type of a model framework, a path of a script, a path of a training data set, and model hyper-parameters.

When model training is started, a user sends a training request to the server through the client, the training request includes the functional command and the configuration data, the functional command configured to indicate a function performed by the server and includes functions such as running models and testing models. The configuration data includes the type of the model framework to be used for the model training, the path of the script, the path of the training data set to be used in a model training process, and the model hyper-parameters.

Furthermore, the type of the model framework includes tensor flow graph frameworks, etc. Since a large amount of training data is used in the model training process, it is more convenient to train a model that can be predicted accurately.

Scripting languages is typically used for the model training, so a full script is required to run the model. The training data set is referred to data used for training the model, and includes pictures, texts, audios or videos etc. The training data set is input to learn corresponding relations of the data, and finally a model is output. Therefore, a complete training data set is needed to realize the model training.

The model hyper-parameters are configurations outside the model, and values of the model hyper-parameters are needed to be set manually. Moreover, the model hyper-parameters are usually adjusted according to different models. In the different models, the model super-parameters include a learning rate, a batch size, an optimizer, iteration times and an activation function, etc. For example, in an optimization algorithm, the model hyper-parameters needed to be set include the learning rate, which is amplitude of updating network weights. Too much learning rate can lead to non-convergence of the model, and too little learning rate can lead to slow convergence of the model so that a longer training time is required.

Step 202, searching through the container server, by the server, whether a first mirror image matched with the type of the model framework is existed in a registration server.

Specifically, it is searched whether the first mirror image is existed in the N mirror images, if the first mirror image matched with the type of the model framework isn't existed in the registration server, it is indicated that configurations of the server are wrong.

Step 203, if the first mirror image matched with the type of the model framework is existed in the registration server, verifying, by the server, whether the script and the training data set are complete, according to the path of the script and the path of the training data set.

Furthermore, the model training is needed to use scripting languages, integrity of the script is a necessary condition for smoothly run codes of the model training, and because the training data set is an important part of the model training, data in the training data set is input from the outside, and the input data can have invalid or wrong information, so the training data set is also a necessary condition for training the model that can be predicted accurately. And in order to run the model training process normally on any node of the server cluster, the training data set is stored by a distributed storage scheme. Therefore, if at least one of the script and the training data set is incomplete, configurations of the server are wrong.

Step 204, if the script and the training data set are complete, determining, by the server, whether the model hyper-parameters are within a preset model hyper-parameter range.

Since the model hyper-parameters are needed to be set manually, and the model hyper-parameters are usually adjusted according to the different models, in this way, reasonable adjustment of the model hyper-parameters can train the model more scientifically and improve resource utilization. In the different models, the model super-parameters include a learning rate, a batch size, an optimizer, iteration times and an activation function, etc. For example, in an optimization algorithm, the model hyper-parameters needed to be set include the learning rate, which is amplitude of updating network weights. Too much learning rate can lead to non-convergence of the model, and too little learning rate can lead to slow convergence of the model so that a longer training time is required, in this way, the leaning rate is usually 0.01, 0.001 and 0.0001. For another example, for training a neural network, the model super parameters needed to be set include the batch size that is number of samples sent into the model by training the neural network at each time. Large batches can usually make the network converge faster, but due to limitation of memory resources, the large batches can cause insufficient memories or program kernel crashes, so the batch sizes are usually 16, 32, 64 and 128.

Step 205, if the model hyper-parameters are within the preset model hyper-parameter range, it is indicated that configurations of the server are correct. The sever is configured to obtain a model framework mirror image corresponding to the type of the model framework from the registration server, wherein the model framework mirror image is configured to encapsulate the model framework and operating environments of the model framework.

Furthermore, the registration server includes a management server and a mirror repository. The management server is configured to be responsible for and maintain information of users' accounts, verifications of mirror images, and information of common namespaces, and the mirror repository is a mirror and chart repository that is authenticated by an authentication identification method of the management server. The mirror repository includes types of a third-party mirror repository, a vendor mirror repository and a private mirror repository. The N mirror images are specifically stored in the mirror repository, and the first mirror image is belonged to the N images stored in the mirror repository.

Optionally, if the first mirror image is stored in a public repository, the first mirror image can be obtained without authentication. The server is configured to send a first obtaining mirror image request through the container engine to the management server, when the management server receives the first obtaining mirror image request, the management server is configured to send the address of the mirror repository to the server. The server is configured to access the address of the mirror repository through the container engine to obtain the first mirror image, and the first mirror image is the model framework mirror image.

Optionally, if the first mirror image is stored in a private repository, it is required to verify authentication to obtain the first mirror image. The server is configured to send a second obtaining mirror image request through the container engine to the management server, when the management server receives the second obtaining mirror image request, the management server is configured to send the address and the verifying identification of the mirror repository to the server.

The sever is configured to send a third obtaining mirror image request through the container engine to the management server, wherein, the third obtaining mirror image request is configured to carry the verifying identification. When the mirror repository receives the third obtaining mirror image request, the mirror repository is configured to verify to the management server whether the verifying identification is correct. When the verifying identification is correct, the server is configured to obtain the first mirror image from the mirror repository, and the first mirror image is the model framework mirror image.

Step 206, if configurations of the server aren't correct, sending, by the server, an operation failure message to the client, wherein the operation failure message is configured to instruct the client to generate an interface for giving a notification that the operation of the model training is failed.

Step 207, starting, by the server, a container configured to operate the model framework mirror image.

Furthermore, in order to run the container, it is needed to specify a mirror image as an initialized file system, therefore, the server is configured to take the model framework mirror image as the initialized file system to start the container. Because the model framework and operating environments of the model framework are encapsulated in the model framework mirror image, after the container is started, the operating environments of the model framework are operated in the container, and the model framework is operated in the operating environments of the model framework.

Step 208, setting, by the server, a source path of data volume to the path of the script and the path of the training data set, and a mount path of the data volume to a path of the container.

Furthermore, the container engine further includes the data volume, the data volume is a specific file or folder in one or more containers and can exist in a host independent of a federated file system and facilitate data sharing and persistence. When the container is created, the data volume is initialized. The data volume can be available for using files within the container when the container is run. The data volume can also be shared and reused between different containers. A life cycle of the data volume is independent of a life cycle of the container, and the data volume can still be existed even if the container is deleted.

Step 209, after the container is started, obtaining, by the server, the script and the training data set through the source path of the data volume.

The server is configured to obtain the paths of the script and the training data set through the source path of the data volume so as to obtain the script and training data set.

Step 210, reading, by the server, the script and the training data set into the container for operation, through the mount path of the data volume.

Step 211, according to the model framework, the script, the training data set, and the model hyper-parameters, performing, by the server, the function command to implement that the function command is configured to instruct the server to execute.

It can be seen that, by the present disclosure, the server is a server pre-selected from a server cluster that includes M servers and meets configuration requirements and load requirements. Each server includes the container engine installed therein and the container engines of all the servers are communicated with the same registration server, in this way, configurations of the model framework can be updated in all the servers and conveniently extend the model framework by only adding the model framework mirror image that encapsulates the model framework and the operating environments of the model framework in the registration server. Moreover, the training data set is stored by the distributed storage scheme so that any server in the server cluster can run the model training process. In addition, the script and the training data set are implemented by a data volume mount way, so that both the script and the training data aren't needed to be encapsulated into the model framework mirror image, thereby the model training can be started on faster.

Figure 3:
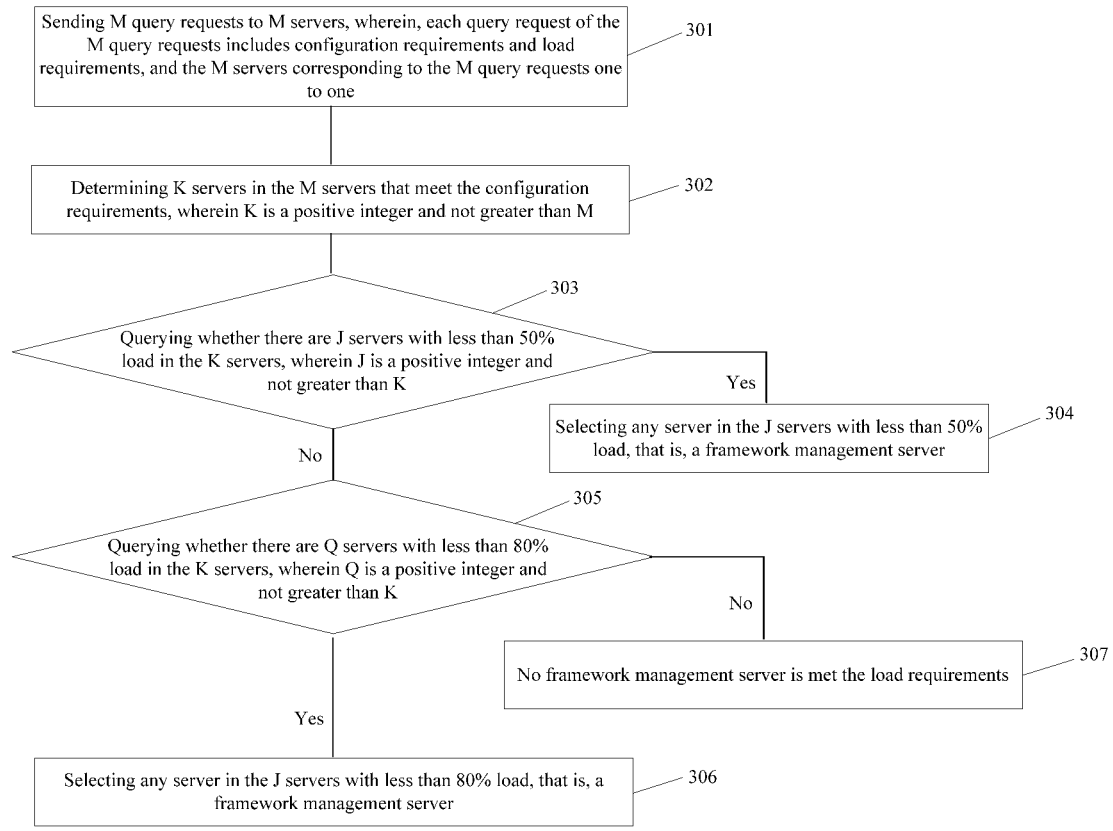
FIG. 3 is a flowchart of a method of selecting a framework management server in accordance with an embodiment of the present disclosure.
Figure 4:
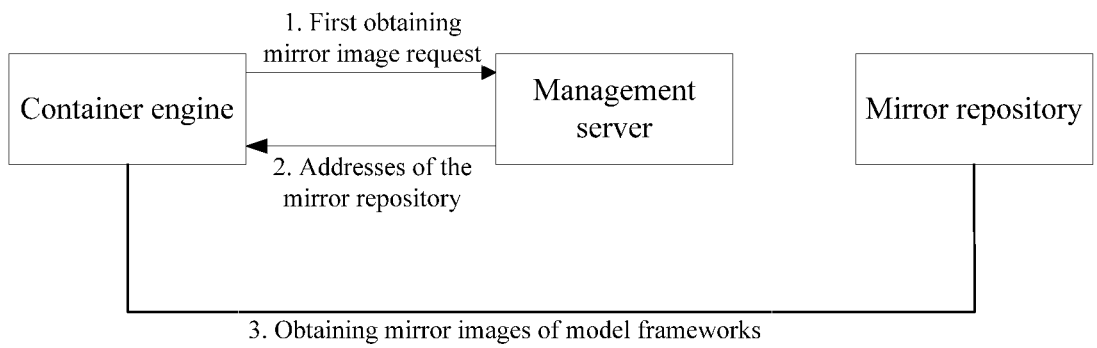
FIG. 4 is a schematic diagram of obtaining a model framework mirror image in accordance with an embodiment of the present disclosure.
Figure 5:
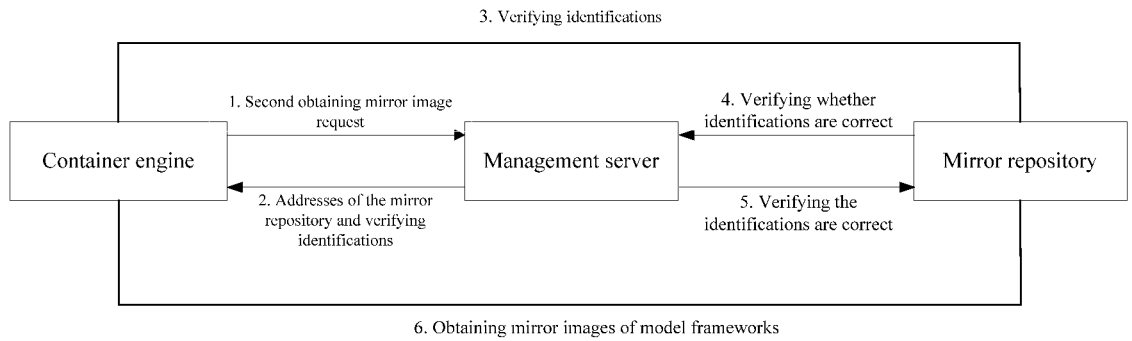
FIG. 5 is a schematic diagram of obtaining a model framework mirror image in accordance with another embodiment of the present disclosure.
Figure 6:
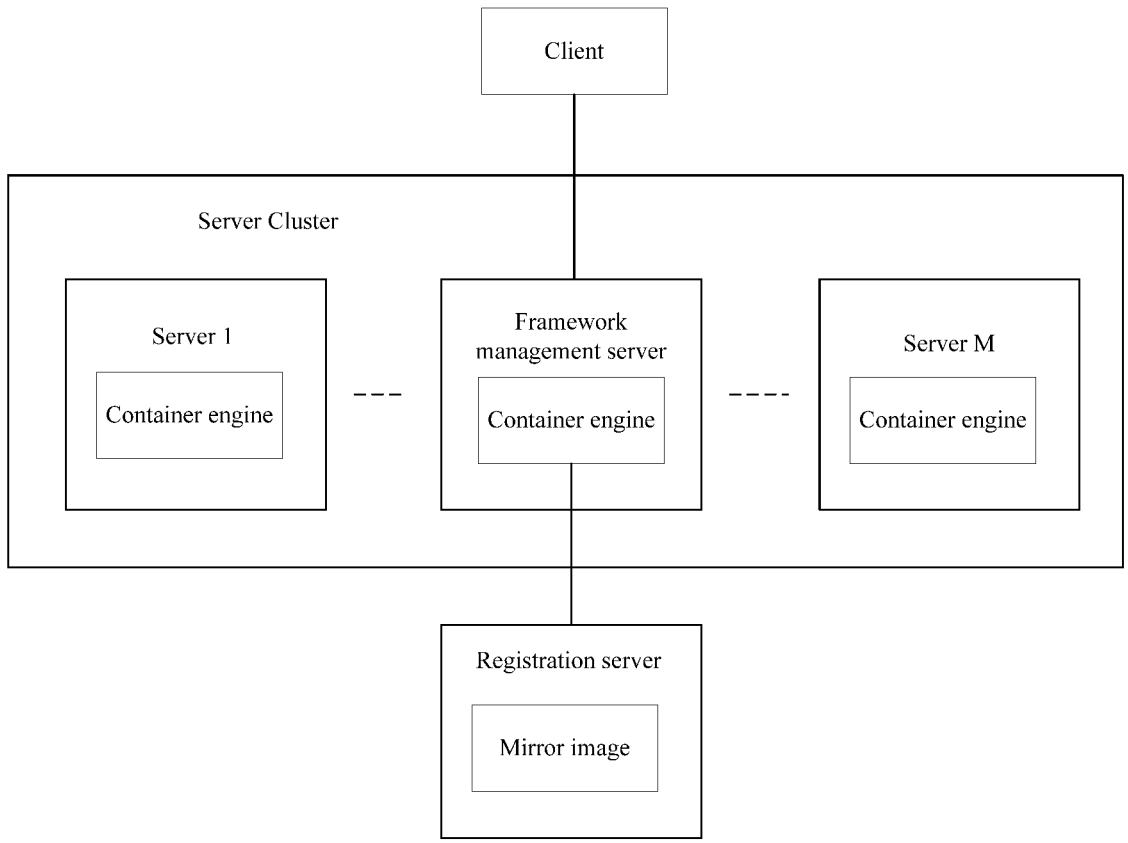
FIG. 6 is a schematic diagram of a framework management system in accordance with an embodiment of the present disclosure.

FIG. 3 illustrates a flowchart of a method of selecting a framework management server in accordance with an embodiment of the present disclosure. Referring to FIG. 3, in the method of selecting a framework management server according to this embodiment of the present disclosure, the framework management server is a server pre-selected from a server cluster that includes M servers and meets configuration requirements and load requirements. In the embodiment of the present disclosure, the method of selecting the framework management server can include:

step 301, sending M query requests to M servers, wherein, each query request of the M query requests includes configuration requirements and load requirements, and the M servers corresponding to the M query requests one to one.

Furthermore, for different models, needed configurations of the server can be different, for example, the training data set includes pictures, texts, audios or videos etc. When the training data set is images, an image processor should be included in the framework management server, so, the server without the image processor can't process and run such kind of models.

Step 302, determining K servers in the M servers that meet the configuration requirements, wherein K is a positive integer and not greater than M.

Step 303, querying whether there are J servers with less than 50% load in the K servers, wherein J is a positive integer and not greater than K.

Step 304, if there are J servers with less than 50% load in the K servers, selecting any server in the J servers with less than 50% load, that is, the framework management server.

Step 305, if there aren't J servers with less than 50% load in the K servers, querying whether there are Q servers with less than 80% load in the K servers, wherein Q is a positive integer and not greater than K.

Step 306, if there are Q servers with less than 80% load in the K servers, selecting any server in the J servers with less than 80% load, that is, the framework management server.

Step 307, if there aren't Q servers with less than 80% load in the K servers, no framework management server is met the load requirements.

It can be seen that, by the present disclosure, during selecting the framework management server, the server that meets the configuration requirements can be first selected from the server cluster, and then the server that meets the load requirements from the server that meets the configuration requirements can be selected. In this way, it can avoid to select the server with high loads, and prevent the server with single point loads from being too high, so as to improve stability of a system.

Figure 7:
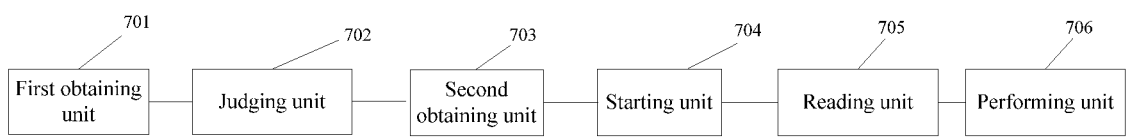
FIG. 7 is a schematic diagram of a framework management server in accordance with an embodiment of the present disclosure.

FIG. 7 illustrates a schematic diagram of a framework management server in accordance with another embodiment of the present disclosure. Referring to FIG. 7, in the framework management server according to this embodiment of the present disclosure, the framework management server includes a container engine installed therein to encapsulate the model framework and the operating environments of the model framework into the model framework mirror image, containers are mirrorly created by the model framework so that no interface is between the containers. In the embodiment of the present disclosure, the framework management server can include:

a first obtaining unit 701 configured to obtain a training request sent by a client, wherein the training request includes a functional command configured to indicate a function performed by the server, and configuration data including a type of a model framework, a path of a script, a path of a training data set, and model hyper-parameters.

A judging unit 702 is configured to determine whether configurations of the server are correct, according to the type of the model framework, the path of the script, the path of the training data set, and the model hyper-parameters included in the configuration data.

Optionally, the container engine is installed in the server and includes a container sever communicated with a registration server, and N mirror images are stored in the registration server and N is a positive integer, the judging unit specifically configured to:

search through the container server, whether a first mirror image matched with the type of the model framework is existed in the registration server, wherein, the first mirror image is belonged to the N images, and if the first mirror image matched with the type of the model framework isn't existed in the registration server, configurations of the server are wrong.

If the first mirror image matched with the type of the model framework is existed in the registration server, verify whether the script and the training data set are complete, according to the path of the script and the path of the training data set, if at least one of the script and the training data set is incomplete, configurations of the server are wrong.

If the script and the training data set are complete, determine whether the model hyper-parameters are within a preset model hyper-parameter range, if the model hyper-parameters aren't within the preset model hyper-parameter range, configurations of the server are wrong.

If the model hyper-parameters are within the preset model hyper-parameter range, configurations of the server are correct.

A second obtaining unit 703 is configured to: if configurations of the server are correct, obtain a model framework mirror image corresponding to the type of the model framework from a mirror repository, wherein the model framework mirror image is configured to encapsulate the model framework and operating environments of the model framework.

The registration server includes a management server and the mirror repository configured to store the first mirror image, the second obtaining unit specifically configured to:

send a first obtaining mirror image request through the container engine to the management server, wherein, the first obtaining mirror image request is configured to indicate that the management server returns an address of the mirror repository to the server; and access the address of the mirror repository through the container engine to obtain the first mirror image, the first mirror image is the model framework mirror image.

Or, the second obtaining unit specifically configured to:

send a second obtaining mirror image request through the container engine to the management server, wherein, the second obtaining mirror image request is configured to indicate that the management server returns the address of the mirror repository and verifying identification to the server, the verifying identification configured for identity authentication of the server;

send a third obtaining mirror image request through the container engine to the management server, wherein, the third obtaining mirror image request is configured to carry the verifying identification and indicate whether the verifying identification that the mirror repository validates to the management server is correct; and obtain the first mirror image from the mirror repository, the first mirror image is the model framework mirror image, when the verifying identification is correct.

A starting unit 704 is configured to starting a container configured to operate the model framework mirror image, wherein the operating environments of the model framework are operated in the container, and the model framework is operated in the operating environments of the model framework.

A reading unit 705 is configured to read the script and the training data set into the container for operation, according to the path of the script and the path of the training data set.

Furthermore, the container engine further includes data volume, the reading unit specifically configured to:

set a source path of the data volume to the path of the script and the path of the training data set;

set a mount path of the data volume to a path of the container;

after the container is started, obtain the script and the training data set through the source path of the data volume; and read the script and the training data set into the container for operation, through the mount path of the data volume.

A performing unit 706 is configured to perform the function command to implement that the function command is configured to instruct the server to execute, according to the model framework, the script, the training data set, and the model hyper-parameters.

It can be seen that, by the present disclosure, during training the model, the server is configured to obtain the training request which carries the type of the model framework, and the server is configured to obtain a corresponding model framework mirror image according to the type of the model framework, so as to start the container for running the model framework mirror image and realize the model training. In this way, there is no need to deploy a plurality of model frameworks and corresponding operating environments in the server, thereby system resources can be saved. Furthermore, since there is no interface between the containers, the model can't be affected by other model frameworks after the container is started for running the model framework mirror image, therefore, the present disclosure can solve problems of environment isolation and resource scheduling when a plurality of model frameworks are coexisted.

Figure 8:
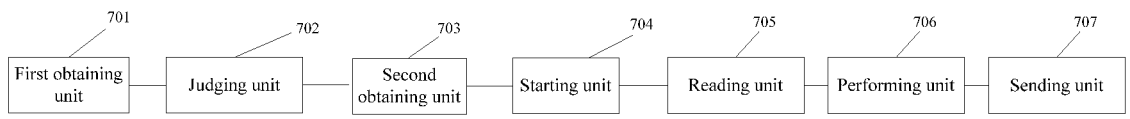
FIG. 8 is a schematic diagram of a framework management server in accordance with another embodiment of the present disclosure.

FIG. 8 illustrates a schematic diagram of a framework management server in accordance with another embodiment of the present disclosure. As shown in FIG. 8, the framework management server in this embodiment of the present disclosure further includes:

a sending unit 707 configured to send an operation failure message to the client if configurations of the server aren't correct, wherein the operation failure message is configured to instruct the client to generate an interface for giving a notification that the operation of the model training is failed.

The framework management server in accordance with embodiments of the present disclosure is basically same as the framework management method of each embodiment shown above, which is not repeated here.

A computer readable storage medium according to an embodiment of the present disclosure is configured to store framework management programs performed by a processor to implement some or all steps of any one of the framework management methods described in the embodiments above mentioned.

What is claimed is:

1. A framework management method applied to an electronic apparatus, the electronic apparatus comprising a processor and a memory wherein computerized programs are stored in the memory and executed by the processor to perform the framework management method, the method comprising:

Obtaining, using a server, a training request sent by a client, wherein the training request comprises a functional command configured to indicate a function performed using the server, and configuration data comprising a type of a model framework, a path of a script, a path of a training data set, and model hyper-parameters;

Determining, using the server, whether configurations of the server are correct, according to the type of the model framework, the path of the script, the path of the training data set, and the model hyper-parameters included in the configuration data;

if configurations of the server are correct, obtaining, using the sever, a model framework mirror image corresponding to the type of the model framework from a mirror repository, wherein the model framework mirror image is configured to encapsulate the model framework and operating environments of the model framework;

starting, using the server, a container configured to operate the model framework mirror image, wherein the operating environments of the model framework are operated in the container, and the model framework is operated in the operating environments of the model framework;

reading, using the sever, the script and the training data set into the container for operation, according to the path of the script and the path of the training data set; and according to the model framework, the script, the training data set, and the model hyper-parameters, performing, using the server, the function command to implement that the function command is configured to instruct the server to execute; and wherein a container engine is installed in the server and comprises a container sever pointed to a registration server, and N mirror images are stored in the registration server and N is a positive integer; the step of determining, using the server, whether configurations of the server are correct, according to the type of the model framework, the path of the script, the path of the training data set, and the model hyper-parameters comprised in the configuration data, comprising:

searching through the container server, using the server, whether a first mirror image matching with the type of the model framework exists in the registration server, wherein, the first mirror image belongs to the N mirror images, and if the first mirror image matched matching with the type of the model framework doesn't exist in the registration server, configurations of the server are wrong;

if the first mirror image matching with the type of the model framework existed in the registration server, verifying, by the server, whether the script and the training data set are complete, according to the path of the script and the path of the training data set, if at least one of the script and the training data set is incomplete, configurations of the server are wrong;

if the script and the training data set are complete, determining, using the server, whether the model hyper-parameters are within a preset model hyper-parameter range, if the model hyper-parameters aren't within the preset model hyper-parameter range, configurations of the server are wrong;

if the model hyper-parameters are within the preset model hyper-parameter range, configurations of the server are correct; and wherein the server is a server that is pre-selected from a server cluster comprising M servers and meets configuration requirements and load requirements.

2. The framework management method as claimed in claim 1, wherein the registration server comprises a management server and the mirror repository configured to store the first mirror image, the step of obtaining, using the sever, the model framework mirror image corresponding to the type of the model framework from the mirror repository, comprising:

sending, using the server, a first obtaining mirror image request through the container engine to the management server, wherein, the first obtaining mirror image request is configured to indicate that the management server returns an address of the mirror repository to the server; and accessing, using the server, the address of the mirror repository through the container engine to obtain the first mirror image, the first mirror image is the model framework mirror image.

3. The framework management method as claimed in claim 1, wherein the registration server comprises a management server and the mirror repository configured to store the first mirror image, the step of obtaining, using the sever, the model framework mirror image corresponding to the type of the model framework from the mirror repository, comprising:

sending, using the server, a second obtaining mirror image request through the container engine to the management server, wherein, the second obtaining mirror image request is configured to indicate that the management server returns the address of the mirror repository and verifying identification to the server, the verifying identification configured for identity authentication of the server;

sending, using the server, a third obtaining mirror image request through the container engine to the management server, wherein, the third obtaining mirror image request is configured to carry the verifying identification and indicate whether the verifying identification that the mirror repository validates to the management server is correct; and when the verifying identification is correct, obtaining, using the server, the first mirror image from the mirror repository, the first mirror image is the model framework mirror image.

4. The framework management method as claimed in claim 2, wherein the container engine further comprises data volume, the step of reading, using the server, the script and the training data set into the container for operation, according to the path of the script and the path of the training data set, comprising:

setting, using the server, a source path of the data volume to the path of the script and the path of the training data set;

setting, using the server, a mount path of the data volume to a path of the container;

after the container is started, obtaining, using the server, the script and the training data set through the source path of the data volume; and reading, using the server, the script and the training data set into the container for operation, through the mount path of the data volume.

5. The framework management method as claimed in claim 1, wherein the method further comprises:

if configurations of the server aren't correct, sending, using the server, an operation failure message to the client, wherein the operation failure message is configured to instruct the client to generate an interface for giving a notification that the operation of model training failed.

6. A framework management server applied to an electronic apparatus, the electronic apparatus comprising a processor and a memory and one or more computerized program units stored in the memory, the one or more computerized program units comprising instructions performed by the processor of the electronic apparatus, the units comprising:

a first obtaining unit implemented by the processor and configured to obtain a training request sent by a client, wherein the training request comprises a functional command configured to indicate a function performed using the server, and configuration data comprising a type of a model framework, a path of a script, a path of a training data set, and model hyper-parameters;

a judging unit implemented by the processor and configured to determine whether configurations of the server are correct, according to the type of the model framework, the path of the script, the path of the training data set, and the model hyper-parameters comprised in the configuration data;

a second obtaining unit implemented by the processor and configured to: if configurations of the server are correct, obtain a model framework mirror image corresponding to the type of the model framework from a mirror repository, wherein the model framework mirror image is configured to encapsulate the model framework and operating environments of the model framework;

a starting unit implemented by the processor and configured to starting a container configured to operate the model framework mirror image, wherein the operating environments of the model framework are operated in the container, and the model framework is operated in the operating environments of the model framework;

a reading unit implemented by the processor and configured to read the script and the training data set into the container for operation, according to the path of the script and the path of the training data set; and a performing unit implemented by the processor and configured to perform the function command to implement that the function command is configured to instruct the server to execute, according to the model framework, the script, the training data set, and the model hyper-parameters; and wherein a container engine implemented by the processor is installed in the server and comprises a container sever pointed to a registration server, and N mirror images are stored in the registration server and N is a positive integer, the judging unit configured to:

search through the container server, whether a first mirror image matching with the type of the model framework exists in the registration server, wherein, the first mirror image belongs to the N mirror images, and if the first mirror image matching with the type of the model framework doesn't exist in the registration server, configurations of the server are wrong;

if the first mirror image matching with the type of the model framework existed in the registration server, verify whether the script and the training data set are complete, according to the path of the script and the path of the training data set, if at least one of the script and the training data set is incomplete, configurations of the server are wrong;

if the script and the training data set are complete, determine whether the model hyper-parameters are within a preset model hyper-parameter range, if the model hyper-parameters aren't within the preset model hyper-parameter range, configurations of the server are wrong;

if the model hyper-parameters are within the preset model hyper-parameter range, determine that configurations of the server are correct; and wherein the server is a server that is pre-selected from a server cluster comprising M servers and meet configuration requirements and load requirements.

7. The server as claimed in claim 6, wherein the registration server comprises a management server and the mirror repository configured to store the first mirror image, the second obtaining unit implemented by the processor and configured to:

send a first obtaining mirror image request through the container engine to the management server, wherein, the first obtaining mirror image request is configured to indicate that the management server returns an address of the mirror repository to the server; and access the address of the mirror repository through the container engine to obtain the first mirror image, the first mirror image is the model framework mirror image.

8. The server as claimed in claim 6, wherein the registration server comprises a management server and the mirror repository configured to store the first mirror image, the second obtaining unit implemented by the processor and configured to:

send a second obtaining mirror image request through the container engine to the management server, wherein, the second obtaining mirror image request is configured to indicate that the management server returns an address of the mirror repository and verifying identification to the server, the verifying identification configured for identity authentication of the server;

send a third obtaining mirror image request through the container engine to the management server, wherein, the third obtaining mirror image request is configured to carry the verifying identification and indicate whether the verifying identification that the mirror repository validates to the management server is correct; and obtain the first mirror image from the mirror repository, the first mirror image is the model framework mirror image, when the verifying identification is correct.

9. The server as claimed in claim 7, wherein the container engine further comprises data volume, the reading unit implemented by the processor and configured to:

set a source path of the data volume to the path of the script and the path of the training data set;

set a mount path of the data volume to a path of the container;

after the container is started, obtain the script and the training data set through the source path of the data volume; and read the script and the training data set into the container for operation, through the mount path of the data volume.

10. The server as claimed in claim 6, wherein the server further comprises a sending unit implemented by the processor and configured to send an operation failure message to the client if configurations of the server aren't correct, wherein the operation failure message is configured to instruct the client to generate an interface for giving a notification that the operation of model training is failed.

11. A non-transitory computer readable storage medium applied to an electronic apparatus, the electronic apparatus comprising a processor, a memory electrically connected to the processor and configured to store computer programs, the computer programs comprising program instructions performed by using the processor of the electronic apparatus to implement a framework management method, the method comprising:

obtaining, using a server, a training request sent by a client, wherein the training request comprises a functional command configured to indicate a function performed using the server, and configuration data comprising a type of a model framework, a path of a script, a path of a training data set, and model hyper-parameters;

determining, using the server, whether configurations of the server are correct, according to the type of the model framework, the path of the script, the path of the training data set, and the model hyper-parameters comprised in the configuration data;

if configurations of the server are correct, obtaining, using the sever, a model framework mirror image corresponding to the type of the model framework from a mirror repository, wherein the model framework mirror image is configured to encapsulate the model framework and operating environments of the model framework;

starting, using the server, a container configured to operate the model framework mirror image, wherein the operating environments of the model framework are operated in the container, and the model framework is operated in the operating environments of the model framework;

reading, using the sever, the script and the training data set into the container for operation, according to the path of the script and the path of the training data set; and according to the model framework, the script, the training data set, and the model hyper-parameters, performing, using the server, the function command to implement that the function command is configured to instruct the server to execute; and wherein a container engine is installed in the server and comprises a container sever pointed to a registration server, and N mirror images are stored in the registration server and N is a positive integer, the step of determining, using the server, whether configurations of the server are correct, according to the type of the model framework, the path of the script, the path of the training data set, and the model hyper-parameters comprised in the configuration data, comprising:

search through the container server, whether a first mirror image matching with the type of the model framework exists in the registration server, wherein, the first mirror image belongs to the N mirror images, and if the first mirror image matching with the type of the model framework doesn't exist in the registration server, configurations of the server are wrong;

if the first mirror image matching with the type of the model framework existed in the registration server, verify whether the script and the training data set are complete, according to the path of the script and the path of the training data set, if at least one of the script and the training data set is incomplete, configurations of the server are wrong;

if the script and the training data set are complete, determine whether the model hyper-parameters are within a preset model hyper-parameter range, if the model hyper-parameters aren't within the preset model hyper-parameter range, configurations of the server are wrong;

if the model hyper-parameters are within the preset model hyper-parameter range, determine that configurations of the server are correct; and wherein the server is a server that is pre-selected from a server cluster comprising M servers and meet configuration requirements and load requirements.

* * * * *